United States Patent [19]
Hildebrand

[11] Patent Number: 4,458,940
[45] Date of Patent: Jul. 10, 1984

[54] LOCK FOR WALLS, DOORS AND FOLDING PARTS

[76] Inventor: Karl Hildebrand, Bessemerstrasse 9, D-4006 Erkrath, Fed. Rep. of Germany

[21] Appl. No.: 283,689

[22] Filed: Jul. 15, 1981

[51] Int. Cl.³ .............................................. B62D 27/06
[52] U.S. Cl. .................................... 296/183; 292/167; 292/DIG. 60
[58] Field of Search ................. 296/183, 196, 197, 43, 296/36; 403/166, 46, 44, 43; 292/DIG. 49, DIG. 60, 139, 167, 113

[56] References Cited

U.S. PATENT DOCUMENTS 1,208,182 12/1916 Martin .................................. 296/36
2,189,992 2/1940 Pearce ........................ 292/DIG. 49
2,793,892 5/1957 Hutterer ............................. 296/167

FOREIGN PATENT DOCUMENTS 2116492 10/1972 Fed. Rep. of Germany ........ 296/36
2706063 9/1977 Fed. Rep. of Germany ........ 296/36
2940671 4/1981 Fed. Rep. of Germany ...... 296/183
1340800 9/1963 France ........................ 292/DIG. 49
353134 7/1931 United Kingdom ................ 292/167

*Primary Examiner*—Joseph F. Peters, Jr.
*Assistant Examiner*—Ross Weaver
*Attorney, Agent, or Firm*—Holman & Stern

[57] ABSTRACT

A lock used for folding walls, doors and boards in which a bolt of the lock, moved in translation by a system, is joined at one end to the board and at the other end to the bolt. For keeping the bolt in its fully unlocked or fully locked position, the bolt has a leaf spring acting on the part of the system joined with the bolt so that the bolt and this toggle part are kept in an in-line position in the unlocked or locked condition of the bolt.

8 Claims, 9 Drawing Figures

16
20
6a
6
10
7
6b
8
5'
7a
5
5'
17
4
3
3b
3c
3a 16
20
6a
10
6
7
6b
8
5'
7a
5'
5
3
3b
11
3a

LOCK FOR WALLS, DOORS AND FOLDING PARTS

BACKGROUND OF THE INVENTION

Field of the Invention

The present invention relates to a lock for folding walls, doors and folding boards type in which a bolt is moved by a locking lever joined with the bolt by a driver arm, the lock being designed to be kept in one of its two end positions.

Description of the Prior Art

In the prior art the locking lever has only been designed for motion through an angle of about 90°. Furthermore, special steps have to be taken, such as the use of locking bolts or springs, for keeping the locking lever in the done-up condition of the bolt. It has not been possible so far in the prior art for the locking lever to be positively kept in its two end-of-motion positions with a sort of detent effect.

GENERAL OUTLINE OF THE INVENTION

One purpose of the present invention is that of designing a lock in the case of which the locking lever may be moved through about 180° and which is automatically kept in its two end positions. A further purpose of the invention is that of designing such a lock which may be smoothly and quietly moved into its end positions.

As part of a still further purpose of the invention, a lock is to be produced which may be used not only in the top part of the sidestay of the tipper body of a road truck but at the lower end of such a sidestay for fixing the lower end of the stay with the beam of the body in such a way that the stay may be taken off.

For effecting these and further purposes, in the invention, at a position at which the driver arm is joined with the bolt by a turnpin, a spring is placed, as for example a leaf spring, having the function of acting against the driver arm for forcing the driver arm into an in-line position in relation to the bolt.

As part of a further development of the invention, the driver arm may be made curved or stepped. Because of this design, in connection with the spring-loaded turnpin in the end positions of the locking lever, forces are produced safely locking the system in its end positions. In the case of a further development of the invention between the driver arm and the spring, there is a turnbuckle and the spring for exact adjustment. The spring-loaded turnpin is furthermore taken up in a forked part taking part in adjustment motion and the leaf spring resting against it or against the turnbuckle. As part of the invention, the lock may be let into a sidestay or may be placed in a low open box in which it is fixed.

In the case of a still further development of the invention, which has more specially been designed for use at the lower end of a sidestay, the bolt at the lower end of the driver arm is locked into an eye, which is screwed to a beam of the truck bodywork. As part of the invention, at its lower end, the lock may have side walls for support purposes, taking up, at their lower ends, a turnpin, the turnpin furthermore being taken up in further walls joined with the beam of the bodywork so that the side walls and the support walls are turningly joined together. Furthermore, the eye may be designed for adjustment of its position in the sidestay so as not to get in the way of folding or turning motion of the same.

BRIEF DESCRIPTION OF THE DRAWINGS

In the figures some working examples of the invention will be seen, the structures of FIGS. 1 to 7 being shown in a horizontal position, although they may readily be used upright as shown in FIG. 9.

DETAILED DESCRIPTION

Figure 1:
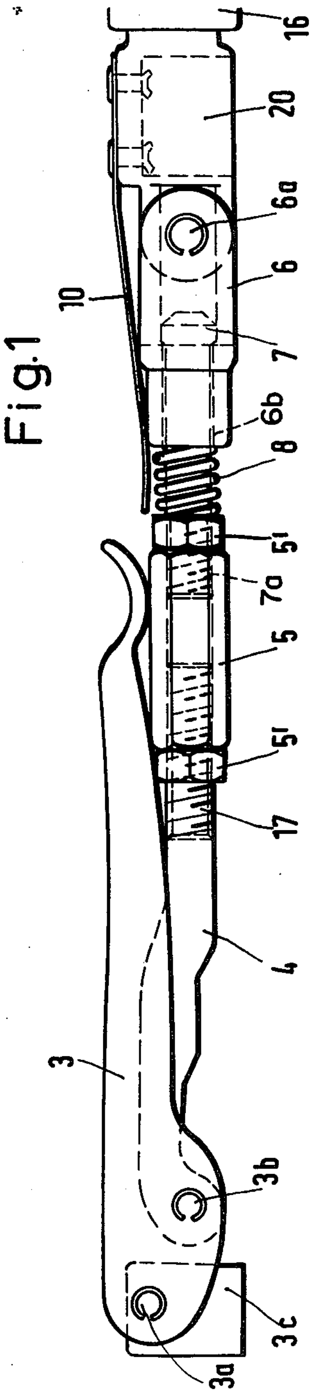
FIG. 1 is a part-side view of a lock.
Figure 2:
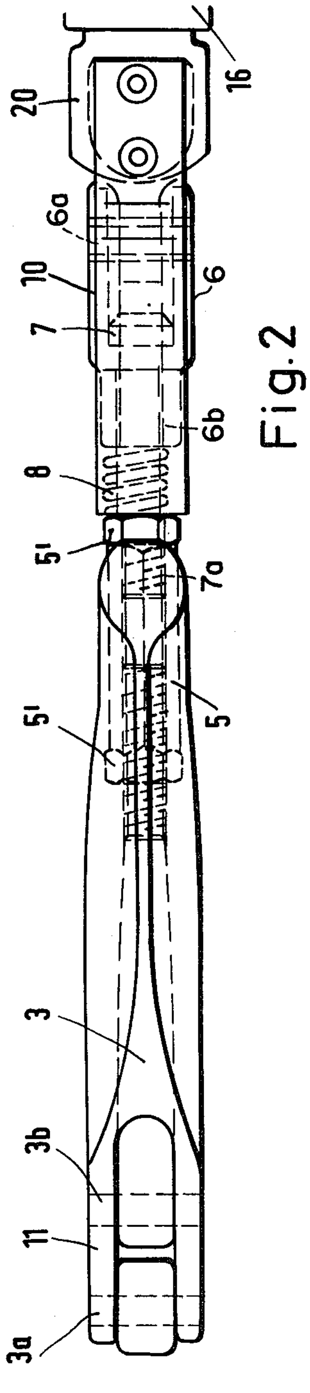
FIG. 2 is a plan view of the lock FIG. 1.

Turning now, more specifically, to FIG. 1, it will be seen that the lock is in a horizontal position, its locking lever 3 being seen in the locking, closed position. The lever 3 may be turned about the pivot pin 3*a*, which is supported in a head 3*c*. By way of pivot pin 3*b*, lever 3 is pivotally connected with driver arm 4, the ends of pin 3*b* being mounted in a forked part 11 at the end of the locking lever. On moving the pin 3*b* from one end to the other of its possible travel about pivot 3*a*, it a circular path of about 180°. As may be seen from FIG. 1, the driver arm 4 is upwardly curved and has a threaded rod end 17 in an in-line position with respect to the right hand part of the system of FIGS. 1 and 2. This right hand end of arm 4 is screwed into a turnbuckle nut 5, having threads of opposite hand for exact adjustment of the length of arm 4. Nut 5 may be locked by nuts 5' once the desired adjustment has been made. Between the adjustment turnbuckle nut 5 and a forked head 6 there is a spiral spring 8 for taking up play in the lengthways direction of the system. Forked head 6 26 slidably and rotatably receives a headed pin 7 forming part of arm 4 and having a left-handed threaded end 7*a* screwed into turnbuckle nut 5 pin 7 received with play in a hole 6*b* in the forked head 6 so that it may be slipped backwards and forwards therein, thereby increasing or reducing compression on spring 8. Turning now to FIG. 2, in which parts, which have other parts in front of them, are marked in dashed lines, it will be seen that forked head 6 is acted upon by a leaf spring 10, forcing head 6 and driver arm 4 into one or other of the positions in which they are in line with bolt 9, as will be made clear below.

At the right hand end of FIG. 2, the reader will, more clearly, see the position of the headed pin 7, together with details of pivot pin 6*a*.

Figures 3, 4:
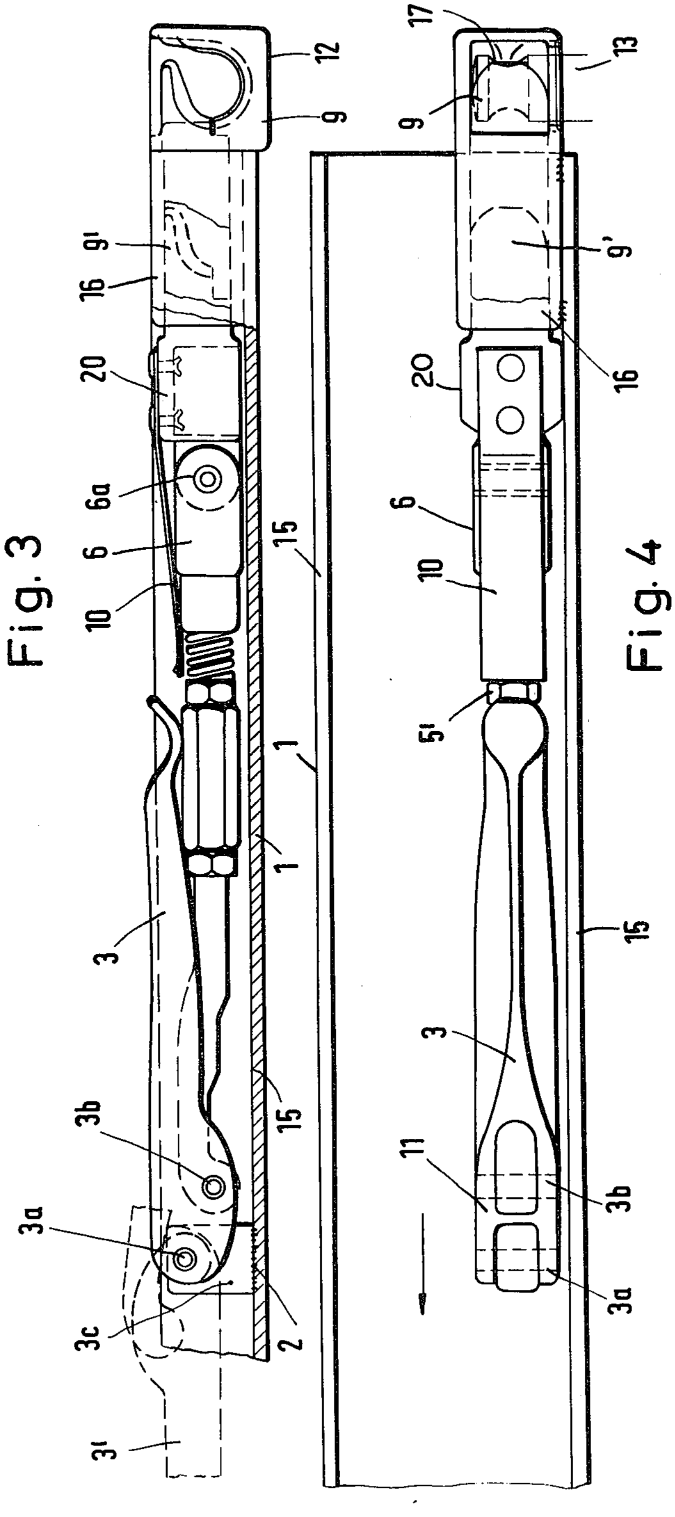
FIG. 3 is a side elevational view on a reduced scale of the complete lock of FIGS. 1 and 2, some of the parts being marked in dashed lines to show their unlocked positions.
FIG. 4 is a top plan view of FIG. 3 showing the lock in a truck sideboard or sidestay turned into a horizontal position.

In FIG. 3, the locked and unlocked positions will be seen of some important parts of the lock, such unlocked positions being shown in dashed lines, one such part being locking lever 3, which is unlocked by turning it about pivot 3*a* about 180° into its dashed-line position 3'.

However, for making the figure more straightforward, parts 6, 7 and 6a are shown only in the locked position in full lines. The unlocked position of bolt 9 is to be seen at the right hand end and is marked 9'. A bolt stempiece 20 is pivotally joined with forked head 6 by pivot pin 6a and to the right of stempiece 20 there is a fixed part of the lock, namely guide 16 for bolt 9, shown in full lines in the locking position. Guide 16, which has an end at 12, is fixed like head 3c on the wall 15 of sidestay or upright 1 forming the base of the lock.

FIG. 4 is a view of my lock in a sidestay of a tipper truck body, the sidestay being seen turned into a horizontal position. A keeper rod 13 has a reduced necked at 17 near its end so that it may be lockingly gripped and acted upon by bolt 9 at its head, that is to say so that the keeper rod 13 is locked in position when rod 13 is moved into pocketpiece 9 at the end of guide 16. FIG. 4 gives the form of the locking lever 3 as seen locking in a downward direction.

Figure 5:
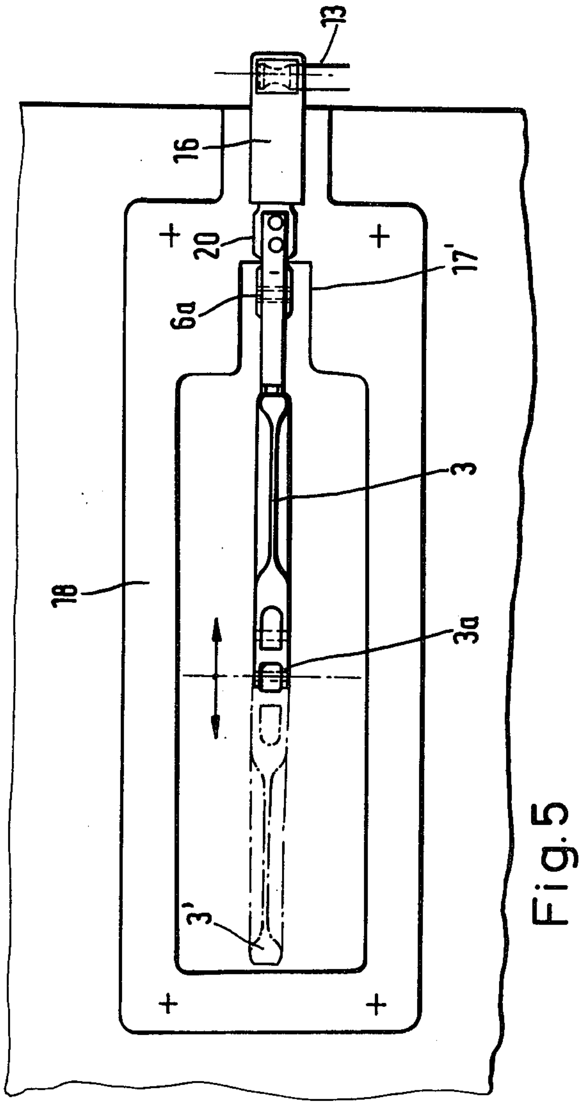
FIG. 5 is a view of an embodiment of my invention as used in an open box or housing.

In FIG. 5 it will be seen that the lock is housed in a low open housing or box 17' having an outwardly extending lip at its edge all the way around for support purposes, the figure not showing much detail because the lock is essentially the same as in FIGS. 1 to 4.

Figure 6:
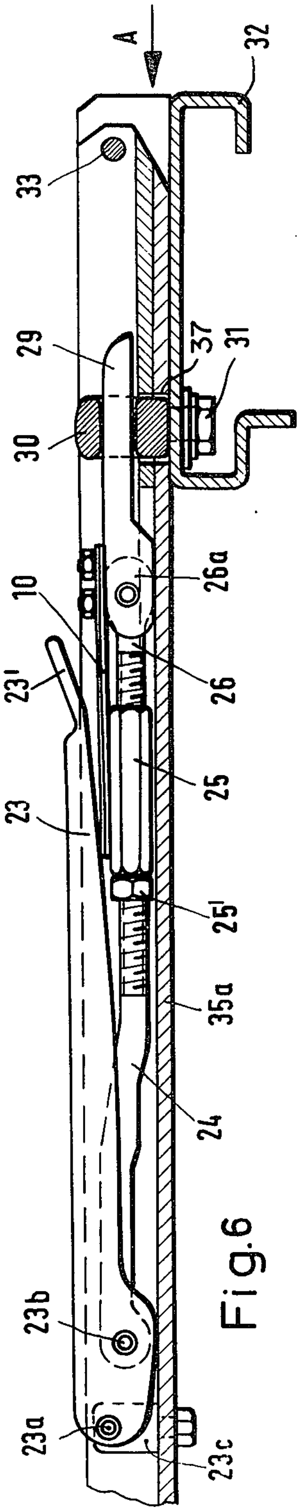
FIG. 6 is an elevational side view of a lock of the present invention in the locked condition, the plate of the truck sidestay being shown in cross-section.

In the embodiment of FIG. 6, the locking lever 23 will be seen in the locked position. Its left hand end is joined with head 23c by pivot pin 23a. Head 23c is fixed to wall 35a of the sidestay 35. Driver arm 24 is pivotally joined with lever 23 by pivot pin 23b and is curved somewhat, its "hollow" side facing wall 35a. Driver arm 24 has a tailpiece in the form of an arm 26 joined to it by a turnbuckle nut 25 having a lock-nut 25' screwed up tight against its left hand end.

Using turnbuckle nut 25 (screwed on threaded ends of arm 24 and arm 26), the distance between driver arm 24 and driving arm 26 may be changed for adjustment as desired. Locking bolt 29 is joined with driving arm 26 by a pivot pin 26a so that driver arm 24 may be turned in relation to bolt 29. Generally over this turnpin 26a a leaf spring 10 is fixed with the function of pushing against driving arm 26 so as to keep the same, the turnbuckle 25 and the driver arm 24 in the in-line positions marked in FIG. 6, and the in-line unlocked positions, as may be desired by the user. At the right hand end of sidestay 35 (that is to say the lower end thereof) there is an opening 37 for receiving an eye 30 fixed by a nut 31 to a beam 32 of the tipper truck's body. In the locked condition the bolt 29 is slipped into this eye 30.

Figure 7:
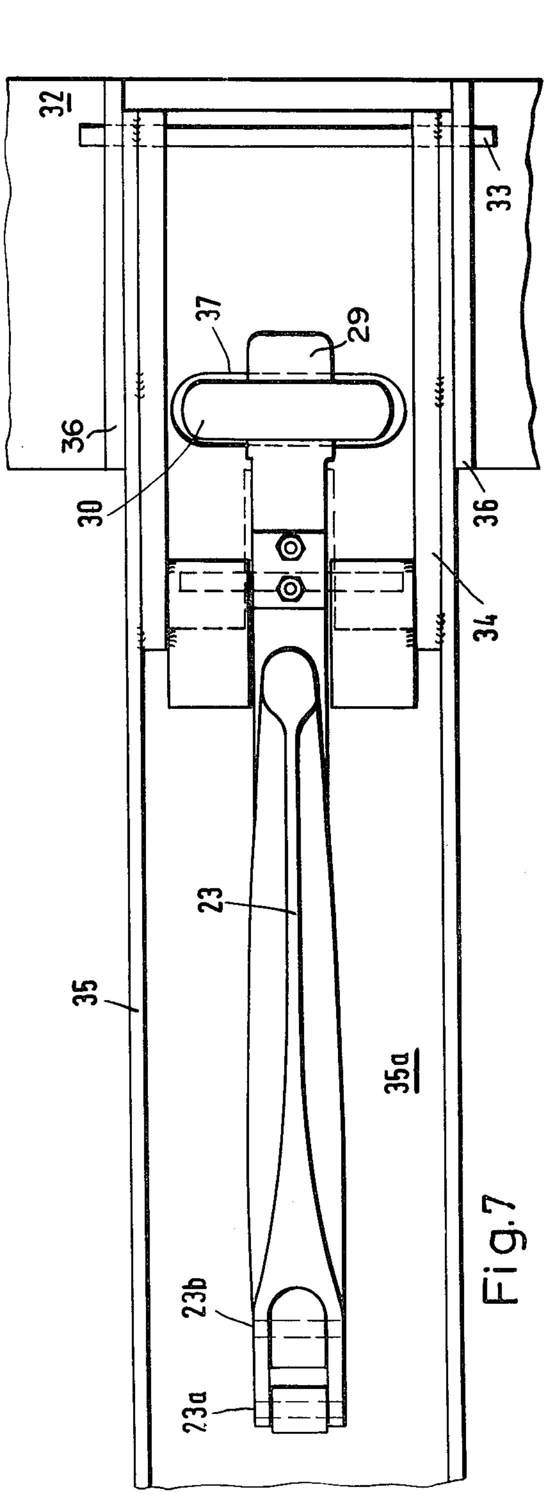
FIG. 7 is a top plan view of the structure of FIG. 6.

At the lower end (to be seen on the right in FIG. 6) of the sidestay there is a pivot pin 33, whose position will be clear from FIG. 7. The ends of pivot pin 33 33 are supported in side walls 36 on the beam 32, see FIG. 7. From FIG. 8 the reader will furthermore see that the end of sidestay 35 is provided with support walls 34 by which the connection with pin 33 is made. On pulling back bolt 29, the lock structure generally may be turned so that eye 30 comes out of hole 37 and then the lock may be swung till it is about 180° out of the position of FIG. 6. This operation makes it very much simpler for the truck tipper body to be taken apart.

Figure 8:
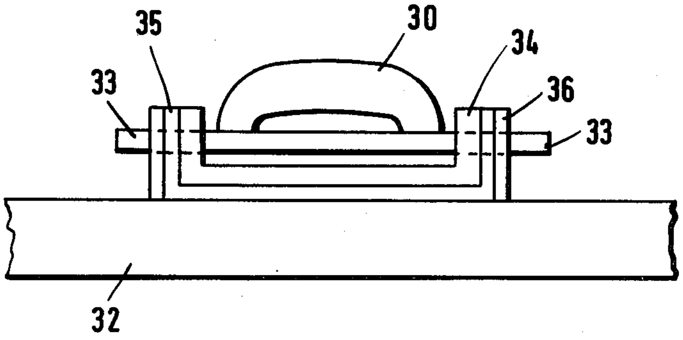
FIG. 8 is a view of the lock of FIG. 6 looking in the direction of arrow A.

The lock of FIGS. 6 to 8 is more importantly different from that of FIGS. 1 to 5 inasmuch as there is no spiral spring needed between the driver arm and the bolt, because undoing bolt 29 is readily possible without such a spring.

The lock of FIGS. 6 to 9 is furthermore different as leaf spring 10 may be used for stopping undesired turning of turnbuckle nut 25.

Figure 9:
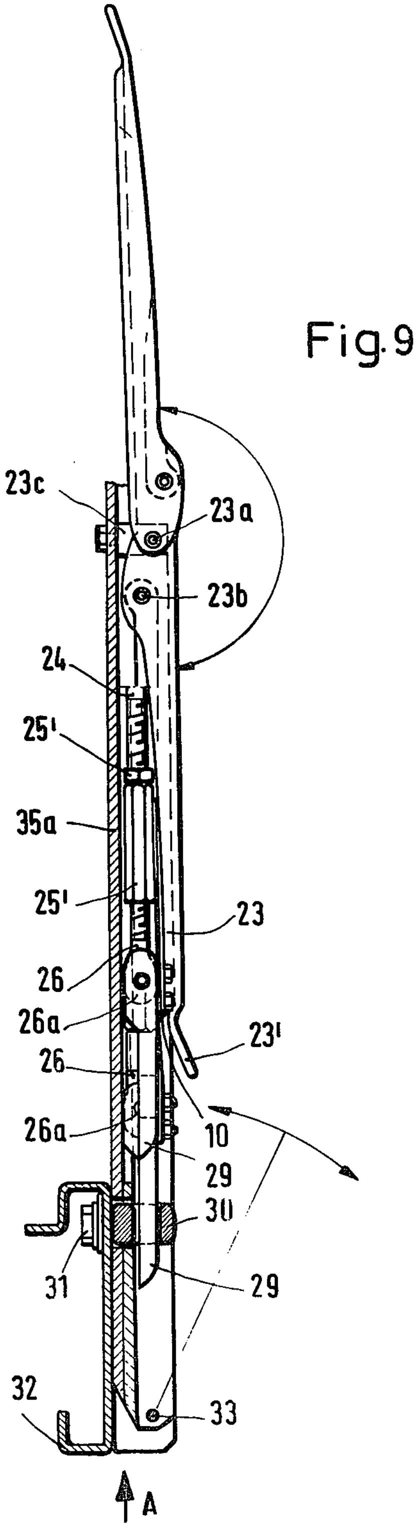
FIG. 9 is a side view of a lock of the present invention in an upright position, showing the motion of the two lock parts.

In FIG. 9 a lock forming part of my invention will be seen in an upright position as fixed to a structure, the locking lever 23 and the bolt 29 being shown in both the upper unlocked and in the lower locking positions. In the locked positions, the nose of bolt 29 goes into eye 30. The turning motion of lever 23 and of other parts of the lock are shown by arrows. It will be seen that after turning lever 23 into its upper, unlocked position, the sidestay may be angled downwards about pin 33 through 180°, that is to say, so that the said sidestay or upright will again be in a vertical position. As will be seen from FIG. 7, opening 37 in sidestay 35 is made somewhat oversize to provide clearance for eye 30 and let sidestay 35 be freely turned downwards.

I claim:

1. In a bolt-type lock for walls, doors, latches, and mutually swingable panels wherein a sliding bolt member is moved axially outwardly into a locking position by an actuating lever pivotably mounted at one end to a stationary element and pivotably mounted between its ends to one end of a driver arm, the driver arm being pivotally mounted at its other end to the bolt member and the outer end of the bolt member is in the form of a gripping device, the improvement wherein the lever is pivotably mounted at said one end to pivot through a substantially 180° angle between the locked and unlocked positions, the driver arm comprises an elongated portion axially slidably connected at said other end to a forked end, said forked end being pivotally connected to the bolt member, a helical spring mounted on said driver arm between said forked end and said one end of the driver arm so that said spring resiliently urges said forked end axially outwardly with respect to said driver arm, means on said other end of the driver arm to retain said forked end against the urging of said helical spring, and a leaf spring fixedly mounted at one end on said bolt member and extending over the pivotable connection between said bolt member and said driver arm and engaging said driver arm between its ends so that said leaf spring exerts a force on said driver arm directed transversely to the longitudinal axis thereof to urge said driver arm about the axis of said pivotable connection to maintain said driver arm substantially axially aligned with said bolt member in the locked and unlocked positions.

2. The bolt-type lock as claimed in claim 1, wherein said driver arm is curved outwardly from said longitudinal axis in the portion thereof adjacent its pivoted connection to said lever.

3. The bolt-type lock as claimed in claim 1, wherein said driver arm has a stepped shape inner surface in the portion thereof adjacent its pivoted connection to said lever.

4. The bolt-type lock as claimed in claim 1, said driver arm further comprising an adjustable turnbuckle with threads of opposite hand therein between said helical spring and said one end thereof.

5. A bolt-type lock in accordance with claim 1, mounted on the lower end of a sidestay of a tipper body to lock the sidestay to the horizontally-running chassis beam, wherein the outer end of said bolt member is in the form of a tongue-shaped bolt, and an opening formed by an eye member is screwed to the chassis beam in alignment with said bolt so that it guides the bolt during axial movement thereof between the locked and unlocked positions.

6. A bolt-type lock according to claim 5, and further comprising support walls attached to said sidestay adjacent the outer end of the lock, side walls on said chassis beam on the outer sides of said support walls, and a pivot pin extending through said support walls and side walls transversely to said longitudinal axis to pivotally connect said sidestay and lock to said chassis beam.

7. A bolt-type lock according to claim 4, wherein said leaf spring engages against said turnbuckle to lock the turnbuckle in the position to which it has been adjusted.

8. A bolt-type lock according to claim 5 and further comprising an opening through said sidestay aligned with said eye member so that said eye member may pass through said opening when said lock and sidestay are moved between the locked and unlocked positions.

* * * * *